(12) United States Patent
Frevert et al.

(10) Patent No.: US 12,445,594 B2
(45) Date of Patent: Oct. 14, 2025

(54) LOCALIZED WINDOW CONTAMINANT DETECTION

(71) Applicant: Waymo LLC, Mountain View, CA (US)

(72) Inventors: Benjamin Frevert, Mountain View, CA (US); Shashank Sharma, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/581,042

(22) Filed: Feb. 19, 2024

(65) Prior Publication Data

US 2024/0195950 A1 Jun. 13, 2024

Related U.S. Application Data

(63) Continuation of application No. 17/930,564, filed on Sep. 8, 2022, now Pat. No. 11,936,845, which is a
(Continued)

(51) Int. Cl.
*H04N 17/02* (2006.01)
*B60S 1/04* (2006.01)
(Continued)

(52) U.S. Cl.
CPC .............. *H04N 17/002* (2013.01); *B60S 1/04* (2013.01); *B60S 1/46* (2013.01); *B60S 1/54* (2013.01);
(Continued)

(58) Field of Classification Search
CPC ...... H04N 17/002; H04N 23/80; H04N 23/56; G01S 17/931; G01S 7/4817; B60S 1/04;
(Continued)

(56) References Cited

U.S. PATENT DOCUMENTS 689,788 A 12/1901 Bryan
3,947,131 A 3/1976 Karl
(Continued)

FOREIGN PATENT DOCUMENTS

GB 2076962 12/1981
WO 2019/206596 10/2019

OTHER PUBLICATIONS

Gu et al., "Dirty Glass: Rendering Contamination on Transparent Surfaces," Eurographics Symposium on Rendering, 2007, 12 pages.

*Primary Examiner* — Trang U Tran
(74) *Attorney, Agent, or Firm* — McDonnell Boehnen Hulbert & Berghoff LLP

(57) ABSTRACT

The present disclosure relates to contaminant detection systems and related optical systems and methods. An example contaminant detection system includes an optical coupler configured to couple light into and/or out of an optical element. The contaminant detection system also includes a plurality of light-emitter devices configured to emit emission light toward the optical coupler. The contaminant detection system additionally includes a plurality of detector devices configured to detect at least a portion of the emission light by way of the optical element and the optical coupler. The plurality of detector devices is also configured to provide detector signals indicative of a presence of a contaminant on the optical element.

20 Claims, 17 Drawing Sheets

Related U.S. Application Data continuation of application No. 17/091,147, filed on Nov. 6, 2020, now Pat. No. 11,457,204.

(51) Int. Cl.
| | |
|---|---|
| *B60S 1/46* | (2006.01) |
| *B60S 1/54* | (2006.01) |
| *G01N 21/94* | (2006.01) |
| *G01S 7/481* | (2006.01) |
| *G01S 17/931* | (2020.01) |
| *G06T 5/73* | (2024.01) |
| *H04N 17/00* | (2006.01) |
| *H04N 23/56* | (2023.01) |

(52) U.S. Cl.
CPC ............ *G01N 21/94* (2013.01); *G01S 7/4817* (2013.01); *G01S 17/931* (2020.01); *G06T 5/73* (2024.01); *H04N 23/56* (2023.01); *G06T 2207/30168* (2013.01); *G06T 2207/30248* (2013.01)

(58) Field of Classification Search
CPC ... B60S 1/46; B60S 1/54; G01N 21/94; G06T 5/003; G06T 2207/30248; G06T 2207/30168
USPC ........................................................ 348/131
See application file for complete search history.

(56) References Cited

U.S. PATENT DOCUMENTS

| | | | |
|---|---|---|---|
| 4,468,120 A | 8/1984 | Tanimoto et al. | |
| 4,605,302 A | 8/1986 | Loefgren et al. | |
| 4,652,745 A | 3/1987 | Zanardelli | |
| 4,808,813 A | 2/1989 | Champetier | |
| 5,196,901 A | 3/1993 | Champetier | |
| 6,108,084 A | 8/2000 | Winner | |
| 6,376,824 B1 | 4/2002 | Michenfelder et al. | |
| 6,940,554 B2 | 9/2005 | Robins et al. | |
| 7,397,560 B2 | 7/2008 | Seaward et al. | |
| 7,602,485 B2 | 10/2009 | Mori | |
| 7,948,617 B2 | 5/2011 | Shubinsky et al. | |
| 8,570,374 B2 | 10/2013 | Betham et al. | |
| 8,643,843 B2 | 2/2014 | Hulm et al. | |
| 9,459,226 B2 * | 10/2016 | Strocchia-Rivera ... | G01N 27/24 |
| 9,538,170 B1 | 1/2017 | Lee et al. | |
| 9,612,000 B2 | 4/2017 | Ooto | |
| 9,939,730 B2 | 4/2018 | Pauls et al. | |
| 10,146,376 B2 | 12/2018 | Wassvik et al. | |
| 10,168,423 B2 | 1/2019 | Lombrozo et al. | |
| 10,421,439 B2 | 9/2019 | Hansen et al. | |
| 10,488,494 B2 | 11/2019 | Nichols et al. | |
| 10,496,227 B2 | 12/2019 | Wassvik et al. | |
| 10,632,507 B2 | 4/2020 | Nabavi | |
| 10,641,877 B2 | 5/2020 | Lombrozo et al. | |
| 10,775,319 B2 | 9/2020 | Niikura et al. | |
| 10,962,361 B2 | 3/2021 | Iseli et al. | |
| 11,042,004 B1 * | 6/2021 | Shepard ................ | G02B 7/003 |
| 2007/0035954 A1 | 2/2007 | Schanz et al. | |
| 2010/0147067 A1 | 6/2010 | Backes | |
| 2017/0225660 A1 | 8/2017 | Trebouet et al. | |
| 2018/0284017 A1 | 10/2018 | Grinderslev et al. | |
| 2021/0228757 A1 | 7/2021 | Vasefi et al. | |
| 2021/0353953 A1 | 11/2021 | Dijkstra | |

* cited by examiner

LOCALIZED WINDOW CONTAMINANT DETECTION

CROSS-REFERENCE TO RELATED APPLICATION

The present application is a continuation of U.S. patent application Ser. No. 17/930,564 filed Sep. 8, 2022, which is a continuation of U.S. patent application Ser. No. 17/091,147, filed Nov. 6, 2020, the contents of each of which are herewith incorporated by reference.

BACKGROUND

Optical elements include structures that are meant to emit, receive, transmit, refract, and/or reflect light. Such optical elements can include windows, windshields, filters, lenses, mirrors, light emitters, or light detectors, among numerous other possibilities. As an example, an optical window over a camera can become contaminated by rain, snow, dirt, and biological materials. These contaminants can block, blur, distort, and scatter light that might otherwise be received by the camera. In such scenarios, it can be difficult to disambiguate, based on an image from the camera only, what is debris and what is the scene. This issue is often exacerbated due to optical window surfaces being out-of-focus in camera images. Furthermore, utilizing image processing techniques to disambiguate blurred portions of a camera image from the unblurred portions can be computationally costly and slow.

SUMMARY

The present disclosure relates to an optical contaminant detection system. The optical contaminant detection system may provide a way to determine whether dust, dirt, water, cracks, etc. are present on an optical element (e.g., an optical window of a camera system).

In a first aspect, a contaminant system is provided. The contaminant detection system includes an optical coupler configured to couple light into and/or out of an optical element. The contaminant detection system also includes a plurality of light-emitter devices configured to emit emission light toward the optical coupler. The contaminant detection system also includes a plurality of detector devices configured to detect at least a portion of the emission light by way of the optical element and the optical coupler. The plurality of detector devices is also configured to provide detector signals indicative of a presence of a contaminant on the optical element.

In a second aspect, an optical system is provided. The optical system includes an optical element and a camera configured to capture an image of a field of view by way of the optical element. The optical system additionally includes an optical coupler configured to couple light into and/or out of the optical element and a plurality of light-emitter devices configured to emit emission light toward the optical coupler. Yet further, the optical system includes a plurality of detector devices configured to detect at least a portion of the emission light by way of the optical element and the optical coupler. The plurality of detector devices are configured to provide detector signals indicative of a presence of a contaminant on the optical element.

In a third aspect, a vehicle is provided. The vehicle includes an optical element and a sensor optically coupled to the optical element. The sensor is configured to obtain information indicative of a field of view by way of the optical element. The vehicle also includes an optical coupler configured to couple light into and/or out of the optical element. The vehicle additionally includes a plurality of light-emitter devices configured to emit emission light toward the optical coupler. The vehicle yet further includes a plurality of detector devices configured to detect at least a portion of the emission light by way of the optical element and the optical coupler. The plurality of detector devices is also configured to provide detector signals indicative of a presence of a contaminant on the optical element.

In a fourth aspect, a method is provided. The method includes causing a plurality of light-emitter devices to emit emission light toward a first optical coupler. The first optical coupler is optically coupled to an optical element. The method additionally includes detecting, by a plurality of detector devices, detector signals that correspond to at least a portion of the emission light by way of the optical element and a second optical coupler. The method yet further includes determining, based on the detector signals, a contaminated region of the optical element.

Other aspects, embodiments, and implementations will become apparent to those of ordinary skill in the art by reading the following detailed description, with reference where appropriate to the accompanying drawings.

DETAILED DESCRIPTION

Figure 1:
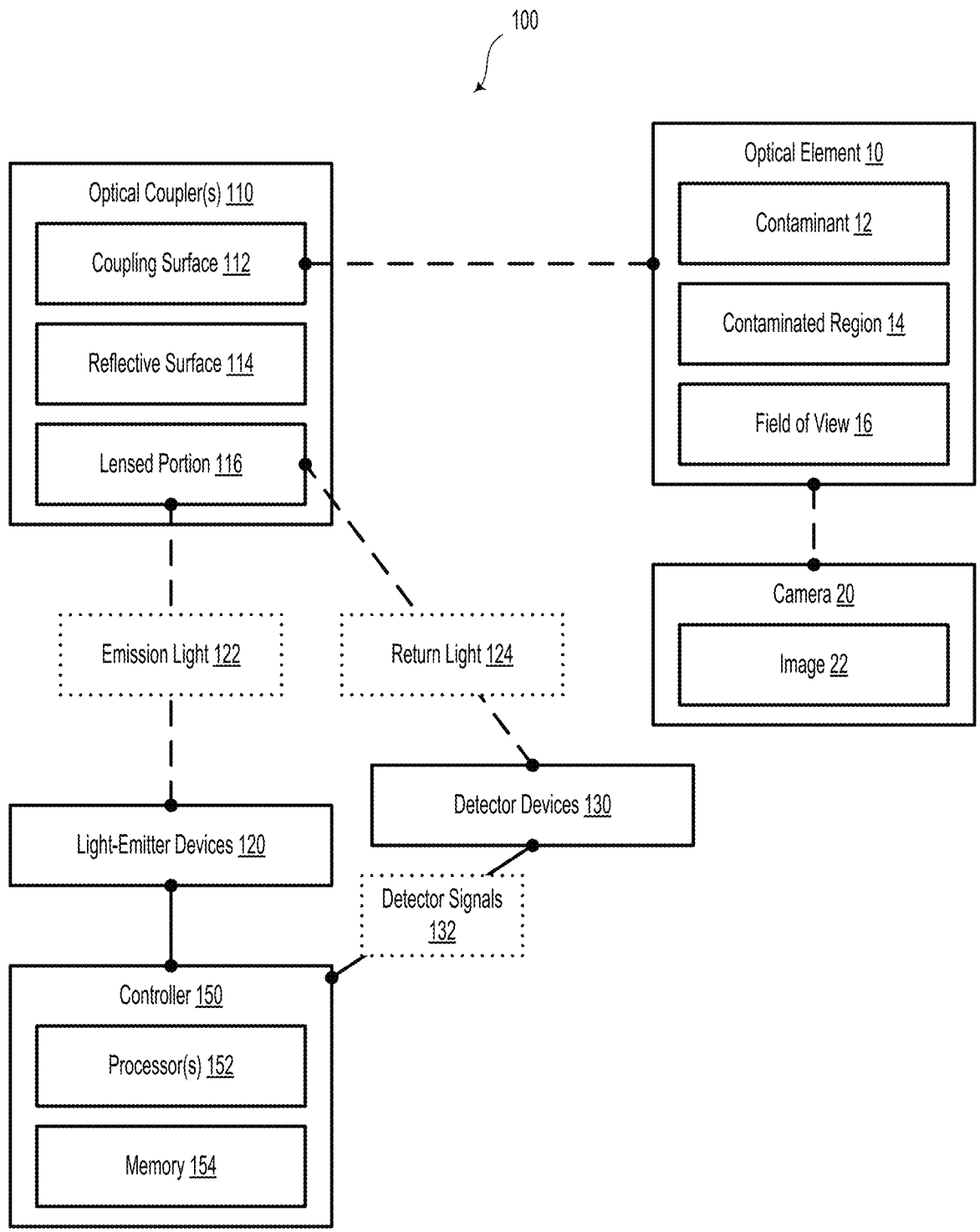
FIG. 1 illustrates a contaminant detection system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to an optical contaminant detection system. The optical contaminant detection system may provide a way to determine whether dust, dirt, water, cracks, etc. are present on an optical element (e.g., an optical window of a camera system). In some embodiments, an array of light sources could emit light that is coupled into the optical window. The light coupled into the optical window can be detected by an array of detectors. If a contaminant material is present on the window it will tend to couple the light out of the optical window, effectively attenuating the detected signal. Over an array of light-emitter/detector pairs, a differential signal could be associated with a contaminant on the optical window. Sunlight and ambient light can be subtracted from the overall detector signals.

The array of light sources could include light-emitting diodes, laser diodes, and/or other types of light-emitter devices that are configured to emit light according to a modulation signal with a frequency between 100 Hz and 100 kHz. In some embodiments, the light sources could be modulated according to a pseudo-random code, such as a maximal length sequence, a Gold code, a Kasami code, or a Barker code. Other modulation sequences are possible and contemplated. In some embodiments, the light sources could be configured to emit infrared light.

In various embodiments, the light sources and detectors could be interleaved (e.g., ABAB, etc.) along two or more edges of a rectangular or square optical element in an N×N or M×N arrangement.

Additionally or alternatively, the array of light sources and detectors could be optically coupled to the optical element by way of one or more optical couplers. In some examples, the optical couplers could be configured to "in-couple" light emitted by the light sources into the optical element and "out-couple" light from the optical element and focus light onto the detector. In some embodiments, an optical coupler could include one or more lensed portions, a reflective surface, and a mounting surface. In some examples, the reflective surface could include a surface that reflects light by way of total internal reflection. In other examples, the reflective surface could include a reflective material (e.g., a metal) that is coated on at least a portion of the optical coupler. The optical coupler could be coupled (e.g., glued or otherwise fastened) to a first surface or second surface of the optical element In scenarios where the present optical contaminant detection system is used with a camera, the light-emitter devices could be oriented to emit light along axes that are parallel with an optical axis of the camera. In other embodiments, the light-emitter devices could be oriented to emit light at an inward angle with respect to the optical axis of the camera. In yet another embodiment, the light-emitter devices could be oriented to emit light at an angle substantially perpendicular to the optical axis of the camera (e.g., parallel to a surface of the optical element).

In some embodiments, the optical coupler could be mounted to the optical element by way of an optical adhesive material (e.g., index-matched optical epoxy).

In various examples, the light-emitter devices and detectors could be arranged along a printed circuit board that is disposed about an optical axis of the camera.

In some examples, a controller could be configured to cause the light-emitter devices to emit light that is coupled into the optical element by way of the optical couplers. The controller could also be configured to receive a plurality of detected signals from the detector devices. Based on the plurality of detected signals, the controller could be configured to determine that a contaminant (e.g., water, dirt, dust, etc.) is present on a surface of the optical element. Upon determining that a contaminant is present, the controller could send an instruction or a notification to clean the optical element. In some embodiments, in response to determining that a contaminant is present on the optical element, the controller could cause a cleaning device (e.g., water jet, wiper, moveable optical element, etc.) to clean the optical element.

Additionally or alternatively, the plurality of detected signals could provide information about a location of the contaminant on the optical element. The controller could be configured to take various actions (or take no action) based on the location of the contaminant along the optical element. For example, if the contaminant is located at a first location (e.g., lower priority portion of the field of view) of the optical element, the controller could take no action. If the contaminant is located at a second location (e.g., medium priority portion of the field of view) of the optical element, the controller could cause the cleaning system to attempt to clean the contaminant from the optical element. Furthermore, if the contaminant is located at a third location (e.g., high priority portion of the field of view) of the optical element, the controller could be configured to downgrade or disregard information from the camera and, in some embodiments, the controller could utilize other sensors to scan the high priority portion of the field of view.

II. Example Contaminant Detection Systems

FIG. 1 illustrates a contaminant detection system 100, according to an example embodiment. The contaminant detection system 100 can be used to detect one or more contaminants (e.g., contaminant 12) on or in an optical element 10 (e.g., a window or a lens) through which an optical sensor (e.g., camera 20) receives light. The contaminant detection system 100 includes a plurality of light-emitter devices 120 that are configured to emit emission light 122 toward an optical coupler 110. In various embodiments, the light-emitter devices 120 could include light-emitting diodes or laser diodes. In some embodiments, the emission light 122 could include light at infrared wavelengths (e.g., between about 700 nanometers and 1 millimeter) of light. As an example, the infrared light could include light having a wavelength of about 905 nanometers (e.g., between 900 and 910 nanometers). However, other wavelengths of emission light 122 are possible and contemplated.

In some examples, the plurality of light-emitter devices 120 could be configured to emit emission light 122 according to a modulation frequency, wherein the modulation frequency is between 100 Hz and 100 kHz. While the light-emitter devices 120 could be configured to turn "on" and "off" according to the modulation frequency, other intensity modulations and/or waveforms (e.g., sawtooth, square wave, stair step, etc.) are possible and contemplated. Furthermore, although such embodiments describe periodic illumination using the light-emitter devices 120, it will be understood that aperiodic illumination (e.g., according to a pseudorandom code) could be provided in addition or in the alternative. For example, the light-emitter devices 120 could be configured to provide emission light 122 based on determination of a potential, predicted, or likely contaminant 12 on the optical element 10 (e.g., during rain/snow conditions). Emission light 122 could be provided in other "as-needed" or "on-demand" scenarios as well.

In various examples, the contaminant detection system 100 could include one or more optical couplers 110 that are configured to couple light into and/or out of the optical element 10. In various embodiments, the optical coupler 110 could include a lensed portion 116 that is configured to be optically coupled to at least one of: at least one light-emitter device of the plurality of light-emitter devices 120, or at least one detector device of a plurality of detector devices 130, described below. The optical coupler 110 could additionally or alternatively include a reflective surface 114 configured to reflect light. The optical coupler 110 could also include a coupling surface 112 configured to be optically coupled to the optical element 10.

In some embodiments, the optical coupler 110 could be configured to guide light by total internal reflection. As an example, the optical coupler 110 may be configured to guide at least a portion of the emission light 122 by total internal reflection. In various embodiments, the optical coupler 110 could be mounted to the optical element 10 by way of an optical adhesive material (e.g., index-matched optical epoxy). In some embodiments, the optical element 10 and the optical coupler(s) 110 could be formed from a single piece of optical material. For example, the optical element 10 and the optical coupler(s) 110 could be incorporated into a single piece of an injection-moldable optical material.

The contaminant detection system 100 also includes a plurality of detector devices 130. The detector devices 130 could be configured to detect at least a portion of the emission light (e.g., return light 124) by way of the optical element 10 and the optical coupler 110.

The detector devices 130 could also be configured to provide detector signals indicative of a presence of a contaminant 12 on the optical element 10. In various embodiments, the contaminant 12 could include at least one of: liquid water, snow, ice, dirt, dust, or crack or a defect in the optical element.

In some embodiments, the contaminant detection system 100 could also include a controller 150. In some embodiments, the controller 150 could include at least one of a field-programmable gate array (FPGA) or an application-specific integrated circuit (ASIC). Additionally or alternatively, the controller could include a processor 152 and at least one memory 154. The one or more processors 152 may include a general-purpose processor or a special-purpose processor (e.g., digital signal processors, graphics processor units, etc.). The one or more processors 152 may be configured to execute computer-readable program instructions that are stored in the memory 154. As such, the one or more processors 152 may execute the program instructions to provide at least some of the functionality and operations described herein.

The memory 154 may include, or take the form of, one or more computer-readable storage media that may be read or accessed by the one or more processors 152. The one or more computer-readable storage media can include volatile and/or non-volatile storage components, such as optical, magnetic, organic, or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of contaminant detection system 100. As such, the memory 154 may include program instructions to perform or facilitate some or all of the operations or functionalities described herein.

For example, the operations include receiving the detector signals 132, from the detector devices 130.

The operations also include determining, based on the detector signals 132, a presence of the contaminant 12 on the optical element 10. In various embodiments, determining the presence of the contaminant 12 on the optical element 10 could include receiving an optical signal amplitude below a predetermined threshold, which could indicate optical out-coupling of light due to the contaminant 12 and/or a crack in the optical element 10. Other ways to determine the presence of the contaminant 12 are also possible, such as making the determination based the detector signals 132 indicating a change in the phase and/or polarization of the received light.

In various embodiments, the operations could additionally or alternatively include determining, based on the detector signals 132, a contaminated region 14 of the optical element 10.

In some embodiments, the detector devices 130 and the controller 150 could additionally be configured to determine a misalignment of the optical element 10 based on the detector signals 132.

In some embodiments, the optical sensor is a camera 20. The camera 20 could be configured to capture an image 22 of a field of view 16 by way of the optical element 10. In such scenarios, the operations could also include causing the camera 20 to capture an image 22 of the field of view 16 and adjusting the image 22 based on the contaminated region 14. In other embodiments, the optical sensor could include a lidar sensor or another type of sensor.

In various embodiments, adjusting the image 22 based on the contaminated region 14 could include processing the image 22 to reduce, eliminate, or otherwise mitigate the effect of the contaminant 12 on the optical element 10. As an example, the image 22 could be processed or otherwise adjusted so as to "unblur" the image 22. Such unblurring could be provided, for example, by applying an unsharp mask or other local image correction adjustments based on the determined contaminated region 14 of the image 22. Other image processing techniques, such as image prediction by way of a trained convolutional neural network (CNN) or other artificial intelligence-based algorithms are possible and contemplated.

Figure 2A:
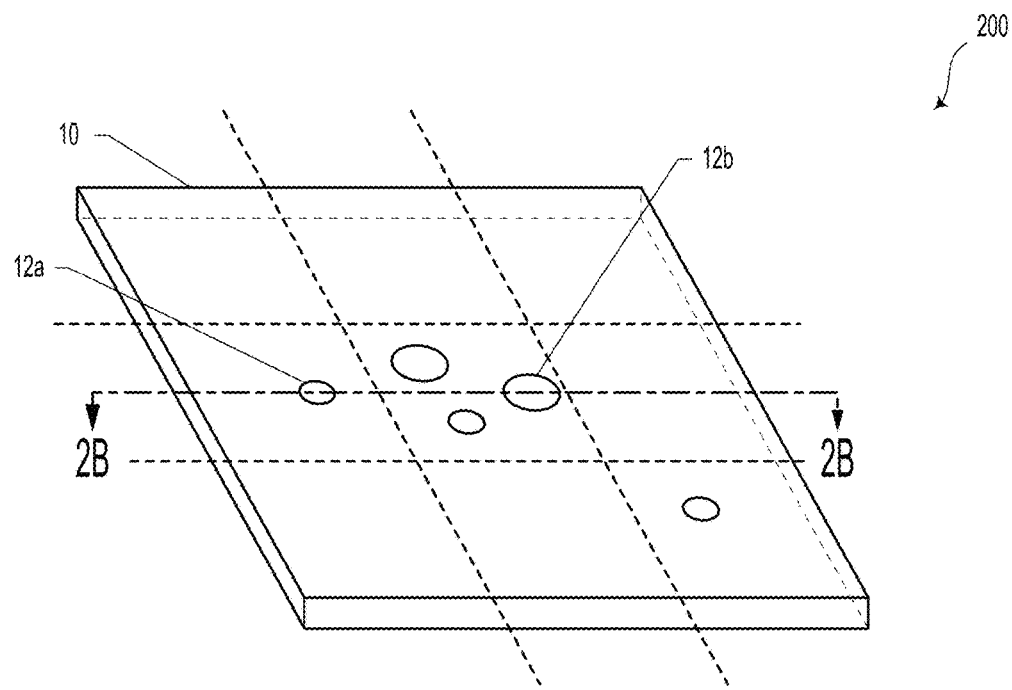
FIG. 2A illustrates a portion of the contaminant detection system of FIG. 1, according to an example embodiment.

FIG. 2A illustrates a portion 200 of the contaminant detection system 100 of FIG. 1, according to an example embodiment. For example, FIG. 2A illustrates optical element 10 having a plurality of contaminants (e.g., contaminant 12a and 12b) on at least one surface. In some embodiments, optical element 10 could include an optical window covering a camera and/or lidar system. However, other types of optical elements are contemplated and possible within the scope of the present disclosure.

Figure 2B:
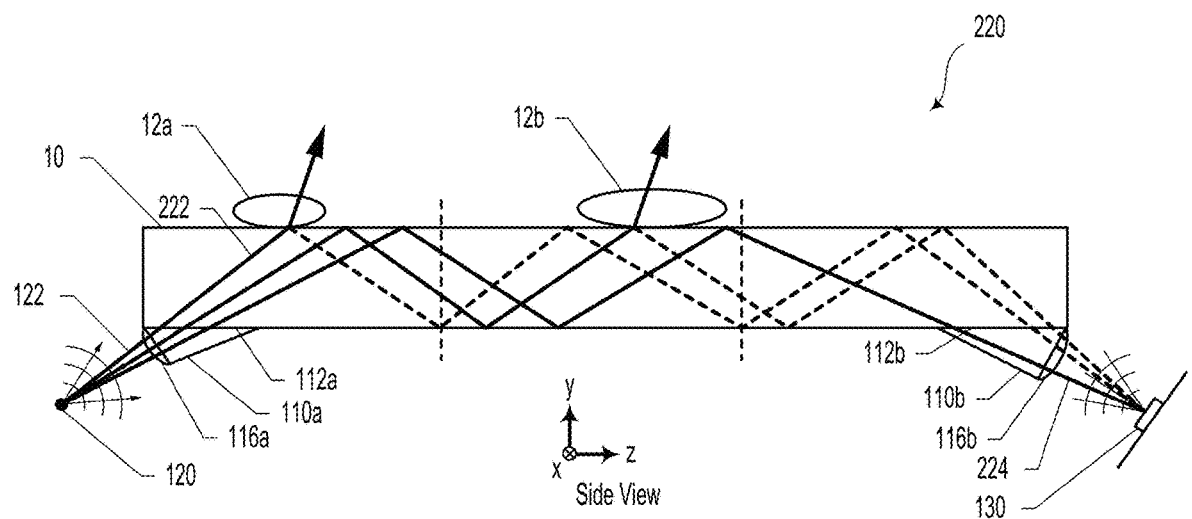
FIG. 2B illustrates a portion of the contaminant detection system of FIG. 1, according to an example embodiment.

FIG. 2B illustrates a portion 220 of the contaminant detection system 100 of FIG. 1, according to an example embodiment. FIG. 2B includes a cross-section of optical element 10 with contaminants 12a and 12b. As illustrated, FIG. 2B also includes light-emitter device 120, which could emit emission light 122 toward optical coupler 110a. Optical coupler 110a could include a lensed portion 116a, which may be configured to collect at least a portion of the emission light 122. The optical coupler 110a could include a coupling surface 112a, which could directly abut a surface of the optical element 10. In such a manner, the light-emitter device 120 and the optical coupler 110a could be operable to optically couple at least a portion of emission light 122 into the optical element 10 as coupled light 222.

The coupled light 222 could propagate along, or traverse, the optical element 10 by way of total internal reflection. Upon interacting with contaminants 12a and/or 12b, at least a portion of the coupled light 222 could be out-coupled from the optical element 10.

FIG. 2B also illustrates a second optical coupler 110b, which could provide a way to efficiently "out-couple" at least a portion of the coupled light 222 from the optical element 10. For example, the second optical coupler 110b could include a coupling surface 112b that could be optically coupled to the optical element 10. The second optical coupler 110b could also include a lensed portion 116b.

The lensed portion 116b could be configured to focus at least a portion of the coupled light 222 (e.g., out-coupled light 224) at or near a location of a detector device 130. As illustrated, the intensity of out-coupled light 224 could be lower than emission light 122. Such an intensity difference could depend, at least in part, on a density, size, and/or type of contaminant on the optical element 10. In such a fashion, the contaminant detection system 100 could determine the presence of one or more contaminants (e.g., contaminants 12a and 12b) along a surface of the optical element 10.

Figure 2C:
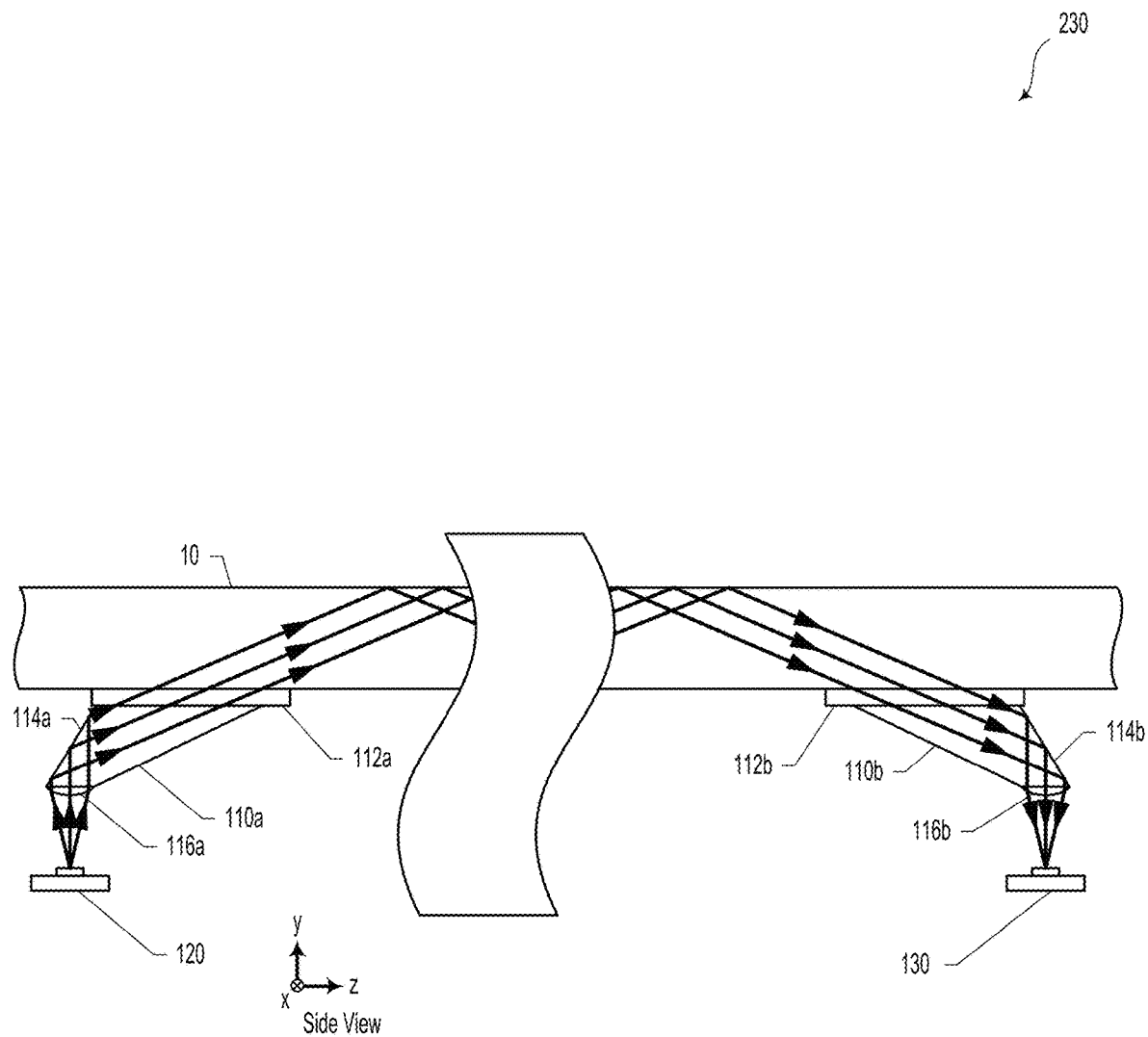
FIG. 2C illustrates a portion of the contaminant detection system of FIG. 1, according to an example embodiment.

FIG. 2C illustrates a portion 230 of the contaminant detection system 100 of FIG. 1, according to an example embodiment. As illustrated in FIG. 2C, portion 230 includes a first optical coupler 110a with a reflective surface 114a and a second optical coupler 110b with a reflective surface 114b.

Figure 2D:
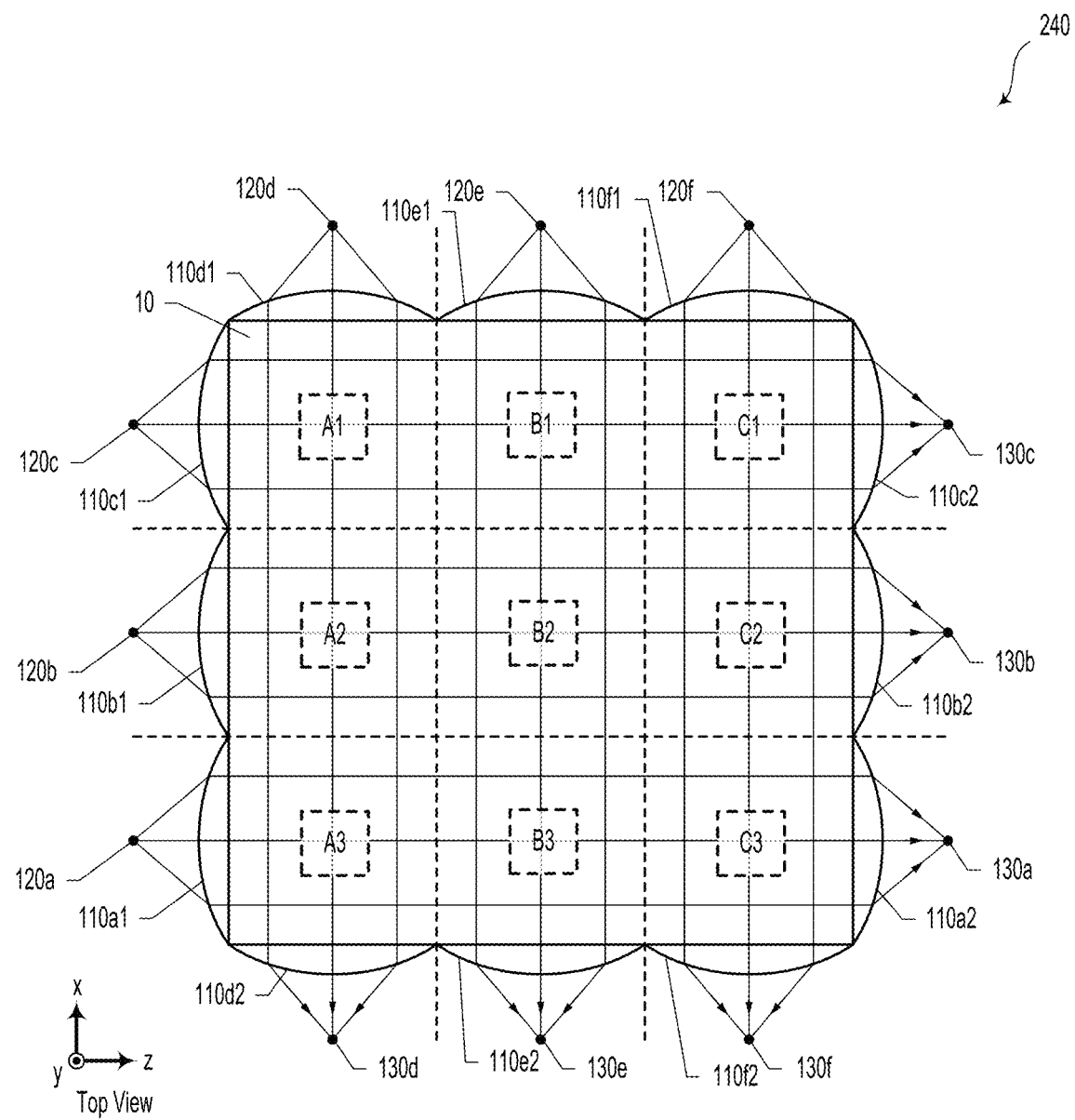
FIG. 2D illustrates a portion of the contaminant detection system of FIG. 1, according to an example embodiment.

FIG. 2D illustrates a portion 240 of the contaminant detection system 100 of FIG. 1, according to an example embodiment. As illustrated, portion 240 could include a plurality of light-emitter devices 120a, 120b, 120c, 120d, 120e, and 120f, a plurality of optical couplers 110a1, 110a2, 110b1, 110b2, 110c1, 110c2, 110d1, 110d2, 110e1, 110e2, 110f1, 110f2, and a plurality of detector devices 130a, 130b, 130c, 130d, 130e, and 130f. In such a scenario, the optical element 10 could be divided into a plurality of regions. In an example embodiment, such regions could be identified with "row/column" address. For example, the columns could be labeled as A, B, and C while the rows can be labeled 1, 2, and 3. In such a scenario, the various regions of optical element 10 could include regions addressed as: A1, B1, C1, A2, B2, C2, A3, B3, and C3.

As described herein, various combinations of light-emitter devices 120, optical couplers 110, and detector devices 130 could provide information about contaminated regions of the optical element 10. In other words, one or more of the various regions A1, B1, C1, A2, B2, C2, A3, B3, and C3 could be determined to be contaminated with a contaminant 12. In such scenarios, the contaminated region(s) 14 could be cleaned and/or corresponding portions of an image could be ignored, adjusted, and/or reacquired as described herein.

Figure 2E:
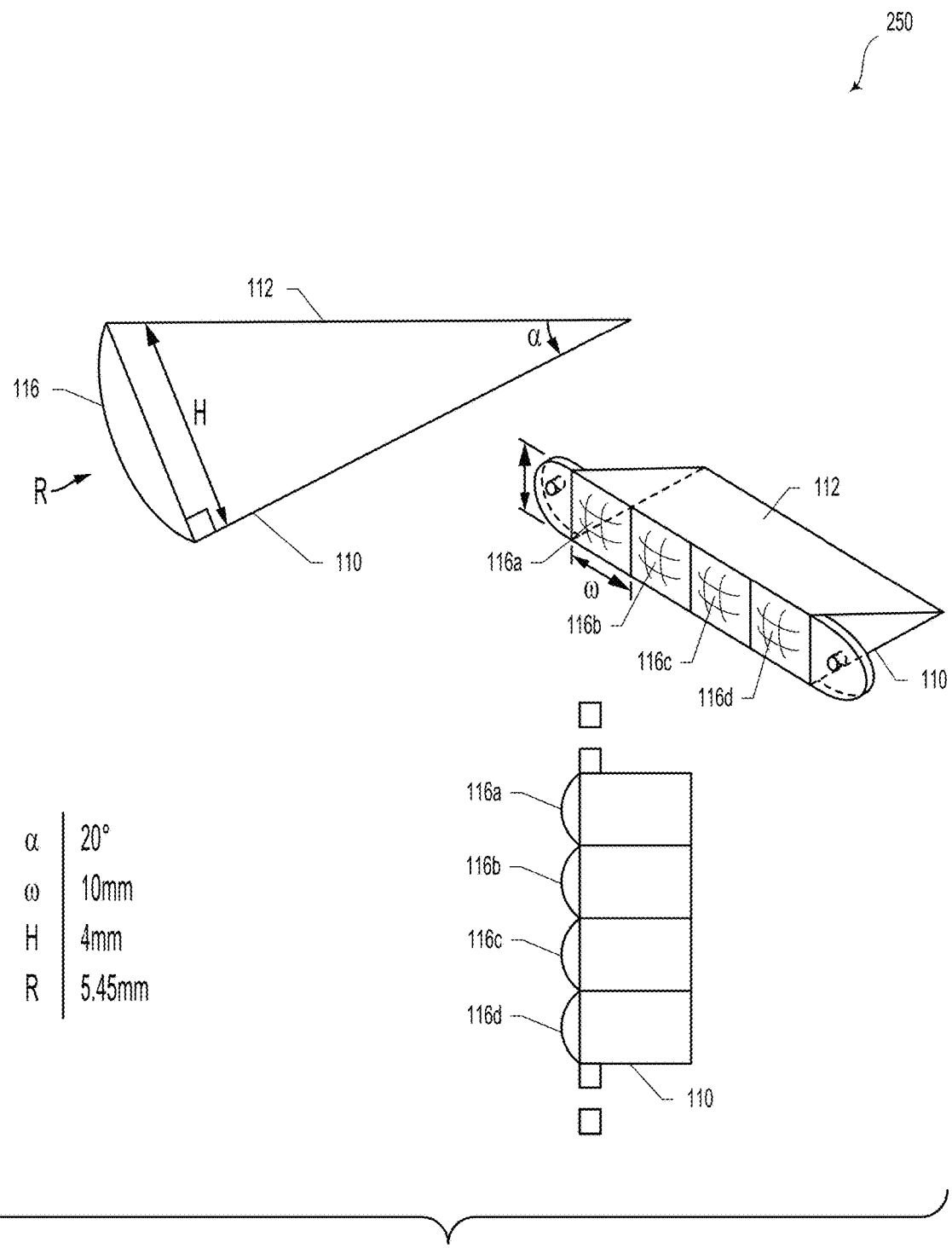
FIG. 2E illustrates a portion of the contaminant detection system of FIG. 1, according to an example embodiment.

FIG. 2E illustrates a portion 250 of the contaminant detection system 100 of FIG. 1, according to an example embodiment. As illustrated in FIG. 2E, an example optical coupler 110 could include a radius of curvature, R, of 5.45 millimeters. In other embodiments, R could be between 2 to 10 millimeters. Other radii of curvature are possible and contemplated. In some embodiments, the optical coupler 110 could have an aperture, H, of approximately 4 mm.

As illustrated, the optical coupler 110 could include a plurality of lensed portions 116a, 116b, 116c, and 116d. In some embodiments, the lensed portions 116a, 116b, 116c, and 116d of the optical coupler 110 could be spaced apart by a distance, ω. In some embodiments, ω could be approximately 4 millimeters. In other embodiments, ω could be between 1 and 10 millimeters.

The optical coupler 110 could also include a coupling surface 112 that could be coupled (e.g., glued or otherwise fastened) to the optical element 10.

The optical coupler 110 could also include an angle α, which could include an angle defined, at least in part, by the coupling surface 112 and the radius of curvature, R, of the lensed portions 116. For example, as illustrated in FIG. 2E, the angle α could be about 20°. Other angles are possible and contemplated.

Figure 2F:
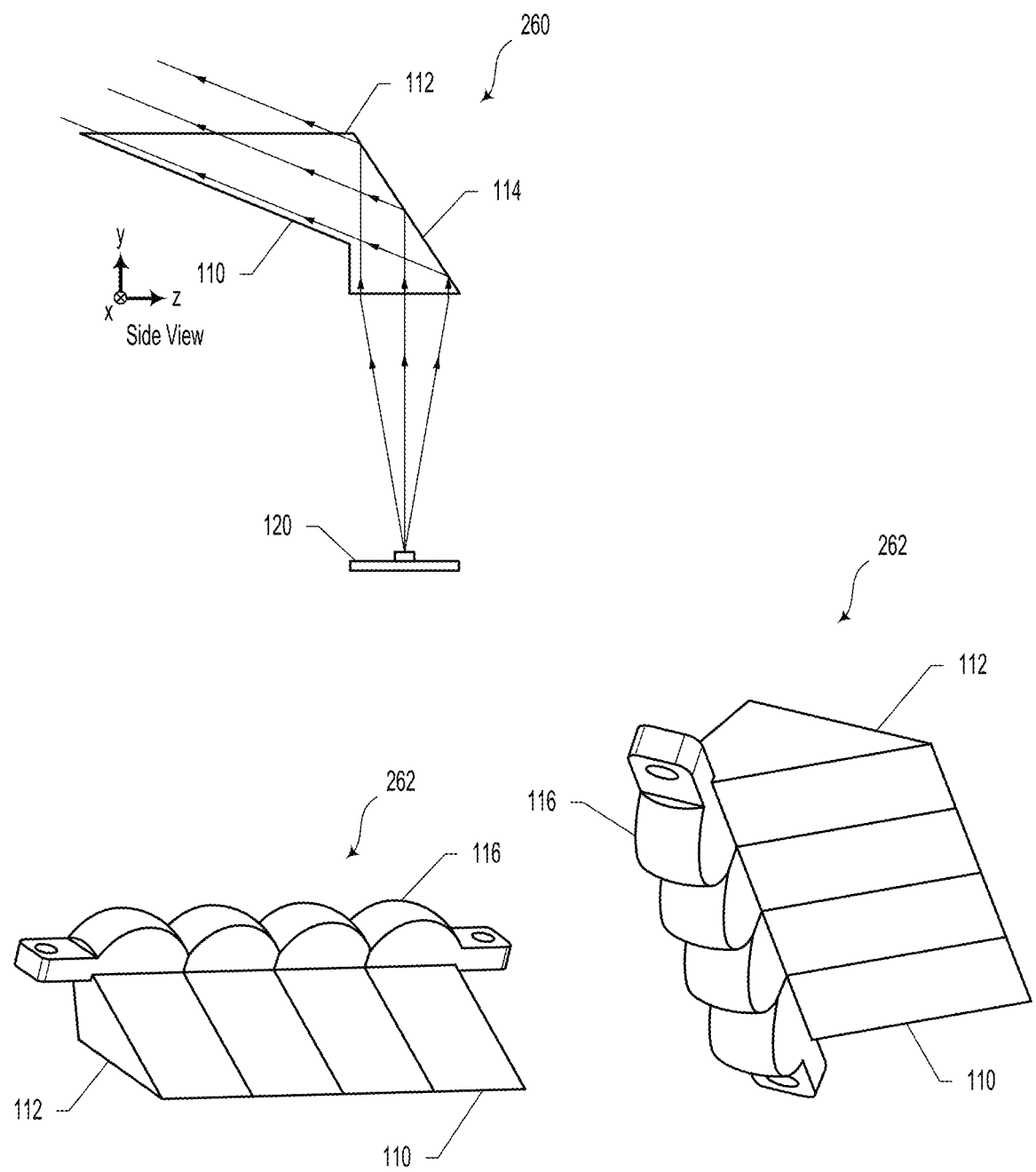
FIG. 2F illustrates several optical couplers, according to example embodiments.

FIG. 2F illustrates several optical couplers 260, 262, according to example embodiments. Optical coupler 260 could include a coupling surface 112 and at least one reflective surface 114. In various other embodiments, optical coupler 262 could additionally or alternatively include lensed portions 116, which could be configured to collect and couple emission light into an optical element 10 and/or focus coupled light toward a detector device 130.

Figure 2G:
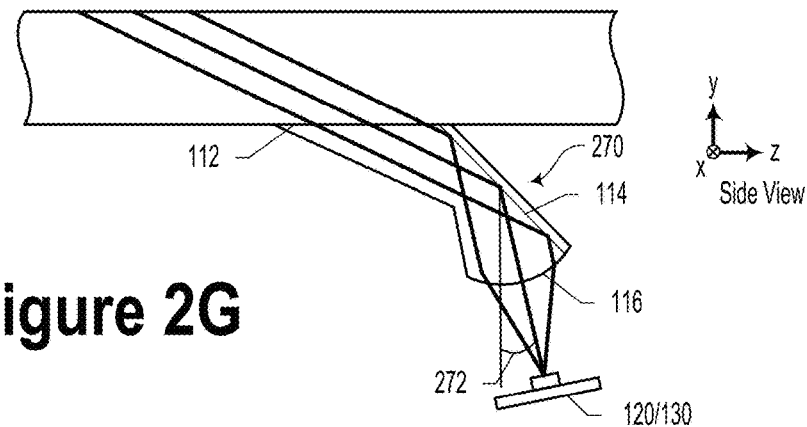
FIG. 2G illustrates an optical coupler, according to an example embodiment.

FIG. 2G illustrates an optical coupler 270, according to an example embodiment. The optical coupler 270 could include a coupling surface 112, a reflective surface 114 and a lensed portion 116. In some embodiments, the optical coupler 270 could be configured to couple light from a light-emitter device 120, or couple light toward a detector device 130. In such a scenario, the light-emitter device 120 or detector device 130 could be disposed at an angle 272 with respect to a normal to the coupling surface 112. In such scenarios, angle 272 could be approximately +10 to +30 degrees.

Figure 2H:
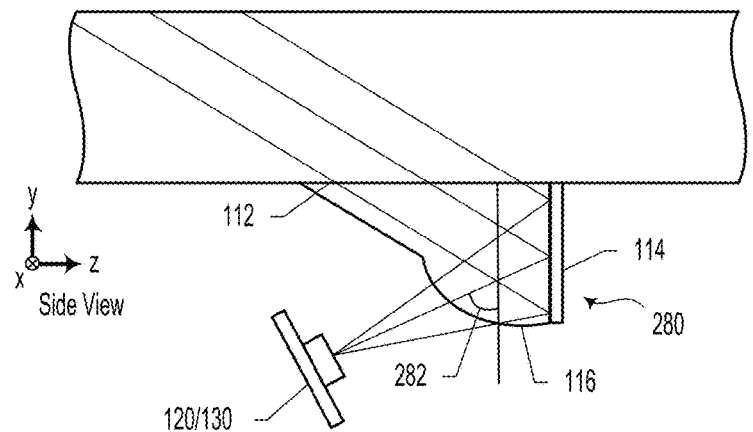
FIG. 2H illustrates an optical coupler, according to an example embodiment.

FIG. 2H illustrates an optical coupler 280, according to an example embodiment. The optical coupler 280 could include a coupling surface 112, a reflective surface 114 and a lensed portion 116. In some embodiments, the optical coupler 280 could be configured to couple light from a light-emitter device 120, or couple light toward a detector device 130. In such a scenario, the light-emitter device 120 or detector device 130 could be disposed at an angle 282 (e.g., −45 to −80 degrees) with respect to the coupling surface 112.

Figure 2I:
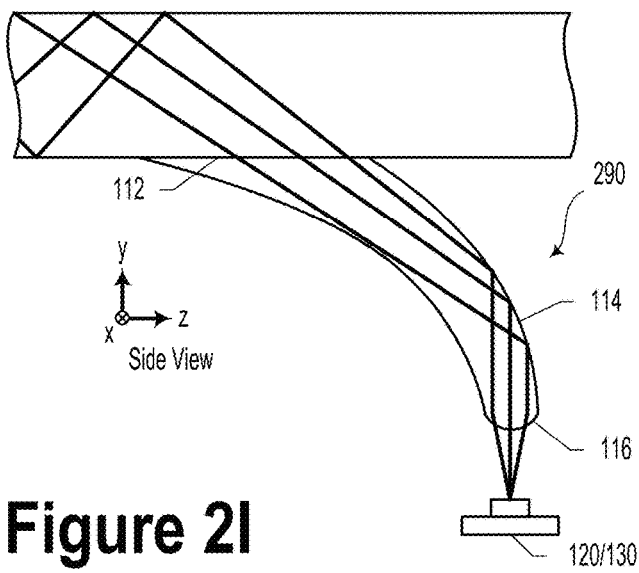
FIG. 2I illustrates an optical coupler, according to an example embodiment.

FIG. 2I illustrates an optical coupler 290, according to an example embodiment. The optical coupler 290 could include a coupling surface 112, a rounded and/or curved reflective surface 114 and a lensed portion 116. In some embodiments, the optical coupler 290 could be configured to couple light from a light-emitter device 120, or couple light toward a detector device 130. In such a scenario, the light-emitter device 120 or detector device 130 could be disposed at a 90 degree angle (e.g., at a perpendicular or normal angle) with respect to the coupling surface 112.

III. Example Optical Systems

Figure 3:
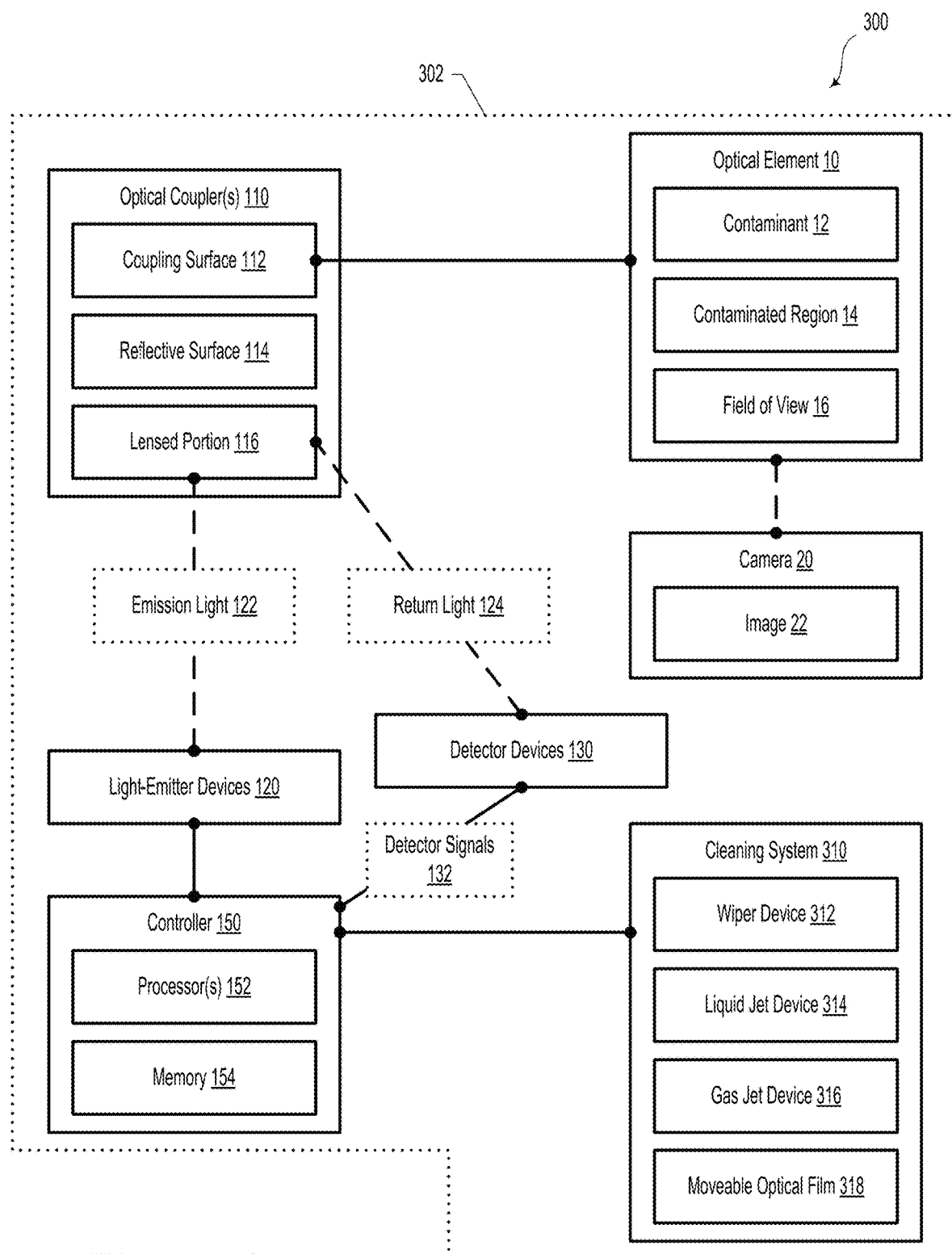
FIG. 3 illustrates an optical system, according to an example embodiment.

FIG. 3 illustrates an optical system 300, according to an example embodiment. In some embodiments, the optical system 300 could include a lidar system or a camera system. In various aspects, the optical system 300 could be similar or identical to contaminant detection system 100, as illustrated and described in reference to FIG. 1. For example, the optical system 300 includes an optical element 10 and a camera 20 configured to capture an image 22 of a field of view 16 by way of the optical element 10.

The optical system 300 also includes at least one optical coupler 110 configured to couple light into and/or out of the optical element 10.

The optical system 300 additionally includes a plurality of light-emitter devices 120 configured to emit emission light toward the optical coupler 110.

The optical system 300 further includes a plurality of detector devices 130 that could be configured to detect at least a portion of the emission light 122 by way of the optical element 10 and the optical coupler 110. The plurality of detector devices 130 could additionally be configured to provide detector signals 132 indicative of a presence of a contaminant 12 on the optical element 10.

In various embodiments, the optical system 300 could include a controller 150 having a processor 152 and at least one memory 154. The processor 152 could be configured to execute instructions stored in the at least one memory 154 so as to carry out operations. In some embodiments, the operations could include receiving, from the detector devices 130, the detector signals 132.

In example embodiments, the operations could also include determining, based on the detector signals 132, a presence of a contaminant 12 on the optical element 10.

In some examples, the optical system 300 could include a cleaning system 310. The cleaning system 310 could include at least one of: a wiper device 312, a liquid jet device 314, a gas jet device 316, or a moveable optical film 318. In such scenarios, the operations could also include in response to determining the presence of the contaminant 12, causing the cleaning system 310 to clean the optical element 10. As an example, upon determining a contaminant 12, the optical system 300 could cause the wiper device 312 to wipe the optical element 10, the liquid jet device 314 to spray a cleaning liquid onto the optical element 10, the gas jet device 316 to provide a pressurized gas to the surface of the optical element 10, and/or move the moveable optical film 318 so as to clean the optical element 10 or otherwise mitigate the effect of the contaminant 12.

In some embodiments, the operations could include determining, based on the detector signals 132, a contaminated region 14 of the optical element 10. In such scenarios, the operations could also include causing the camera 20 to capture an image 22 of the field of view 16. Additionally, in such scenarios, the operations could include adjusting the image 22 based on the contaminated region 14. For example, adjusting the image 22 based on the contaminated region 14 could include processing the image 22 to mitigate the effect of the contaminant 12 on the optical element 10.

In some embodiments, the various elements of optical system 300 could be housed within a common housing 302, such as a lidar sensor housing or a camera sensor housing. In other embodiments, some elements of the optical system 300 could be disposed at separate locations.

Figure 4A:
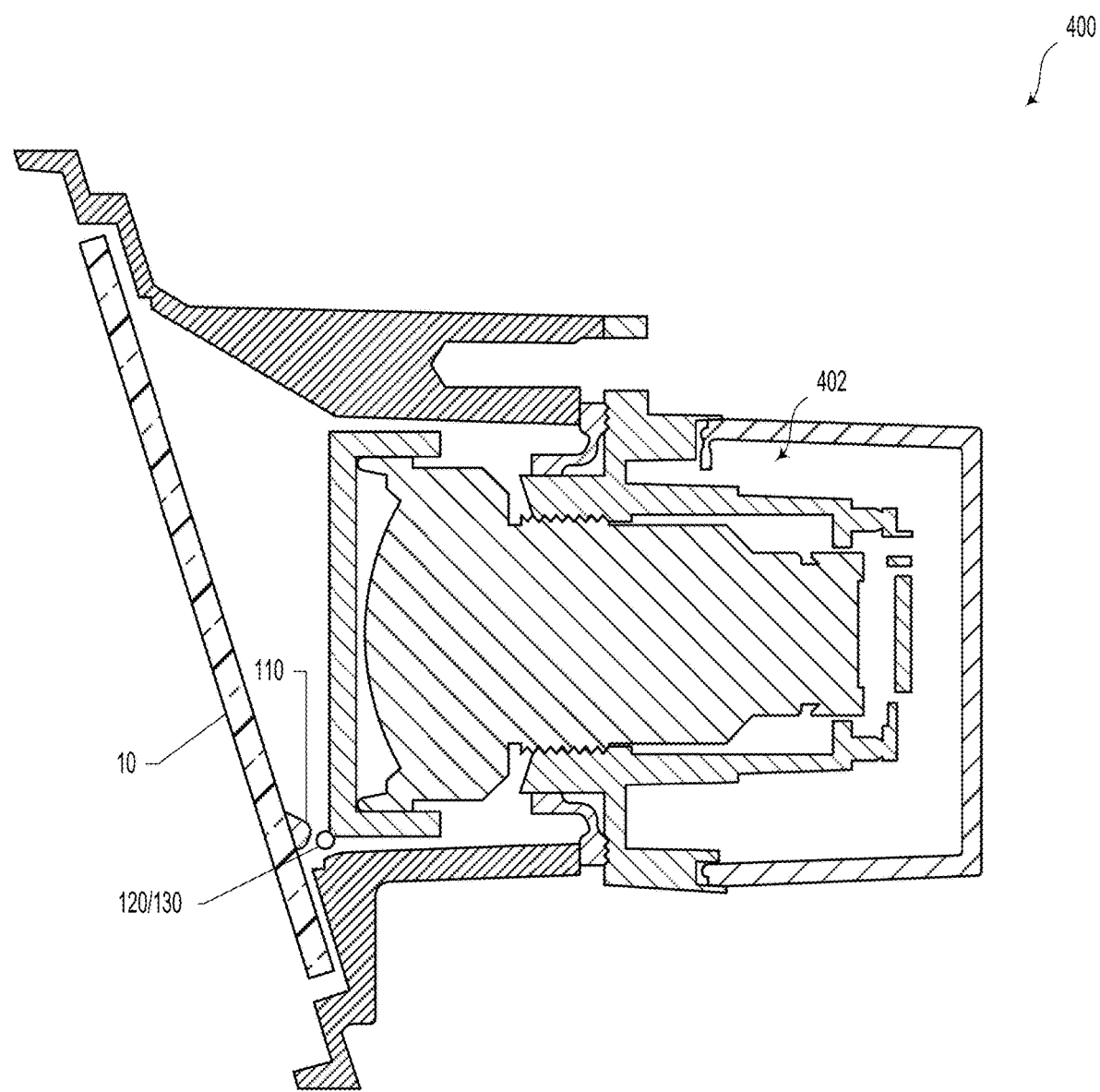
FIG. 4A illustrates a portion of the optical system of FIG. 3, according to an example embodiment.

FIG. 4A illustrates a portion 400 of the optical system 300 of FIG. 3, according to an example embodiment. As illustrated in FIG. 4A, portion 400 of the optical system 300 could include a camera 402 with an optical element 10, which could provide an outer window for the camera 402. As illustrated, an optical coupler 110 could be disposed on and/or coupled to the optical element 10. In various embodiments, the optical coupler 110 could be configured to couple emission light from light-emitter device 120 into the optical element 10. Additionally, the optical coupler 110 could be configured to couple light from the optical element 10 into detector device 130.

Figure 4B:
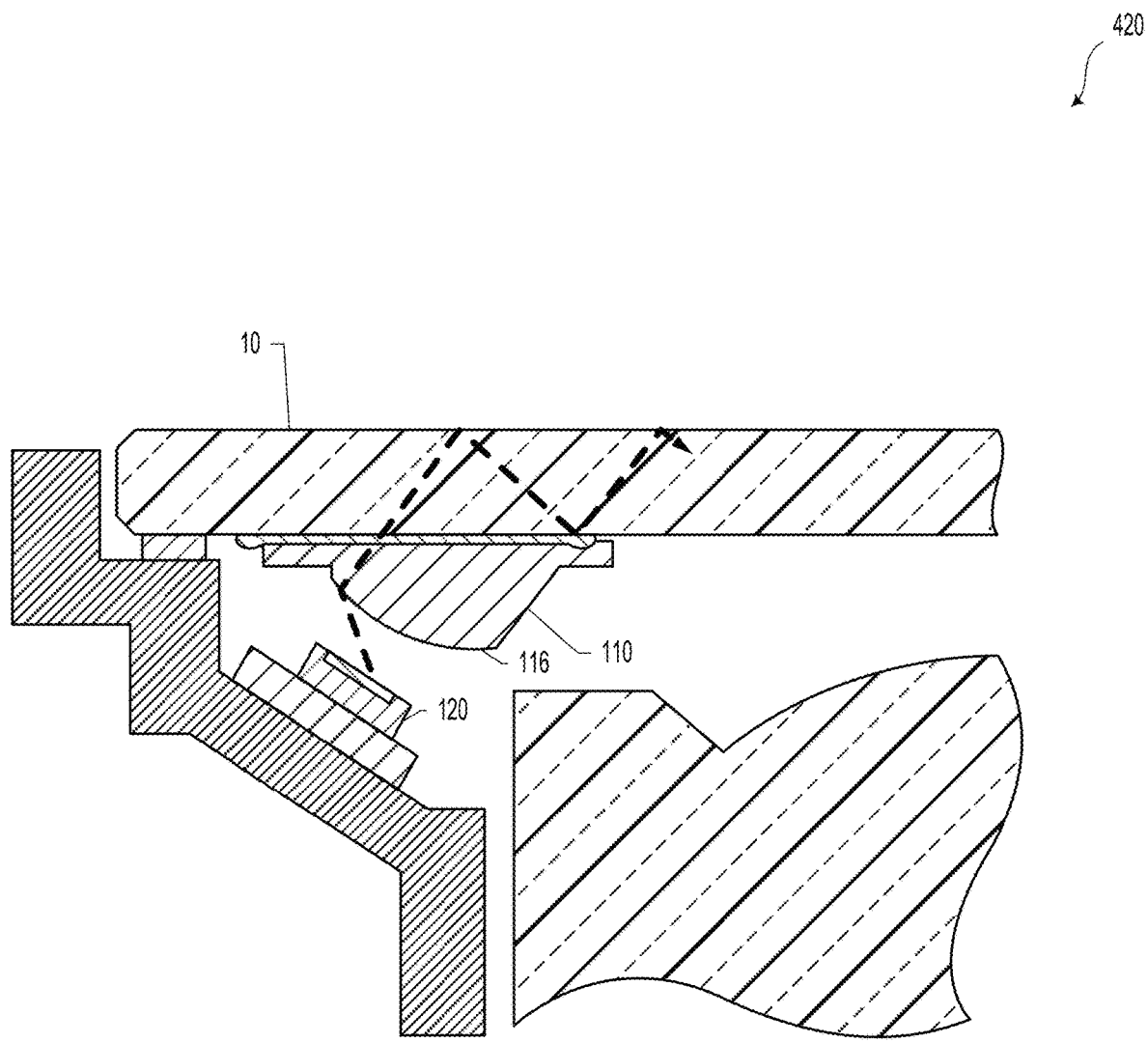
FIG. 4B illustrates a portion of the optical system of FIG. 3, according to an example embodiment.

FIG. 4B illustrates a portion 420 of the optical system 300 of FIG. 3, according to an example embodiment. As illustrated in FIG. 4B, portion 420 of the optical system 300 could include an optical element 10 and an optical coupler 110 that could be disposed on and/or coupled to the optical element 10. In various embodiments, the optical coupler 110 could be configured to couple emission light from light-emitter device 120, by way of a lensed portion 116, into the optical element 10.

Figure 4C:
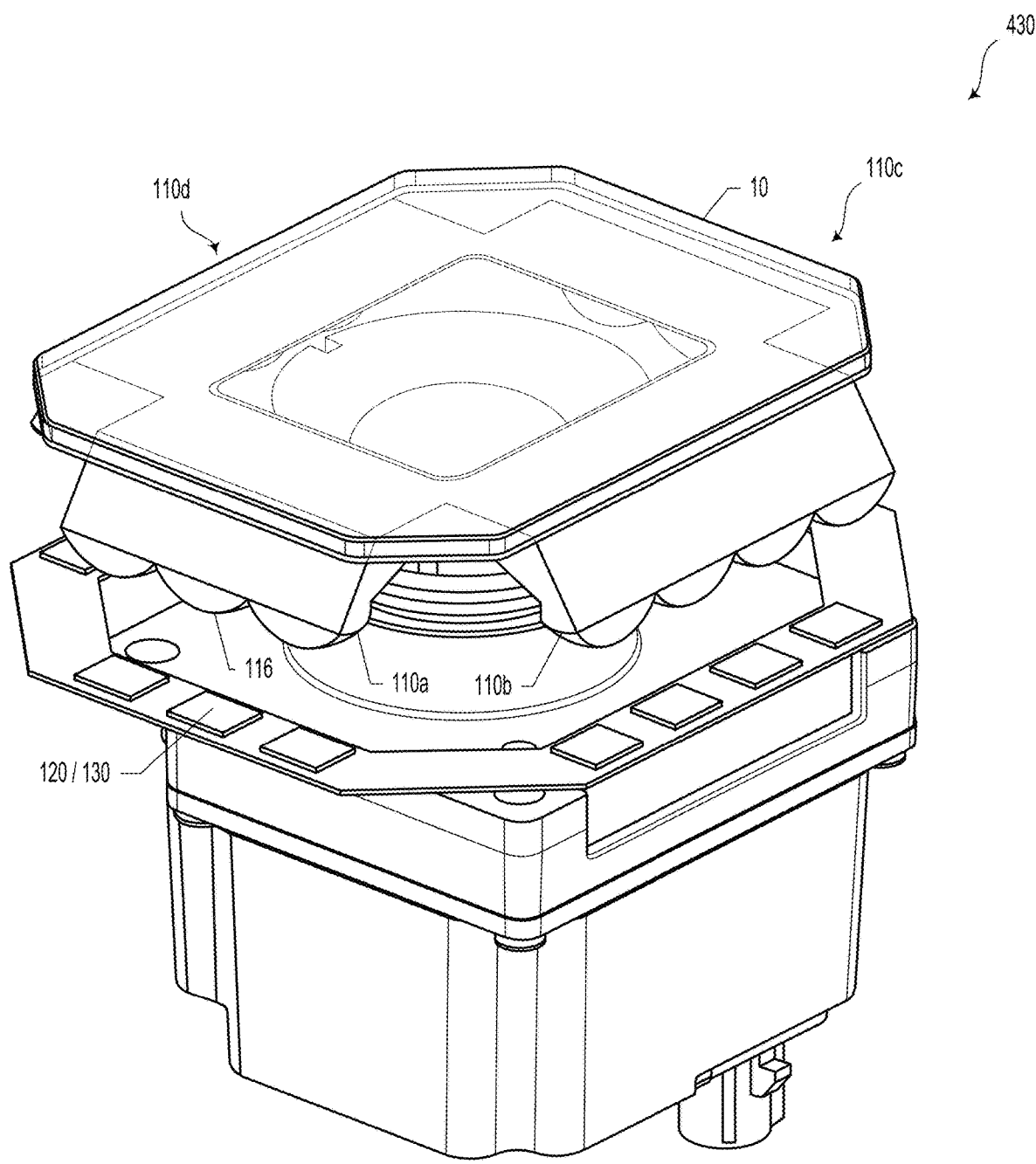
FIG. 4C illustrates the optical system of FIG. 3, according to an example embodiment.

FIG. 4C illustrates the optical system 300 of FIG. 3, according to an example embodiment. As illustrated in FIG. 4C, the optical system 300 could include an optical element 10 (e.g., an external camera window). Furthermore, the optical system 300 could include a plurality of optical couplers 110a, 110b, 110c, and 110d, which could be disposed along the four outer edges of the optical element 10. Furthermore, as illustrated in FIG. 4C, optical system 300 could include a plurality of light-emitter devices 120 and a plurality of detector devices 130 disposed in a 3×4 array. In such a scenario, the present system and methods could determine a contaminated region or regions from 12 different regions of the optical element 10.

Figure 4D:
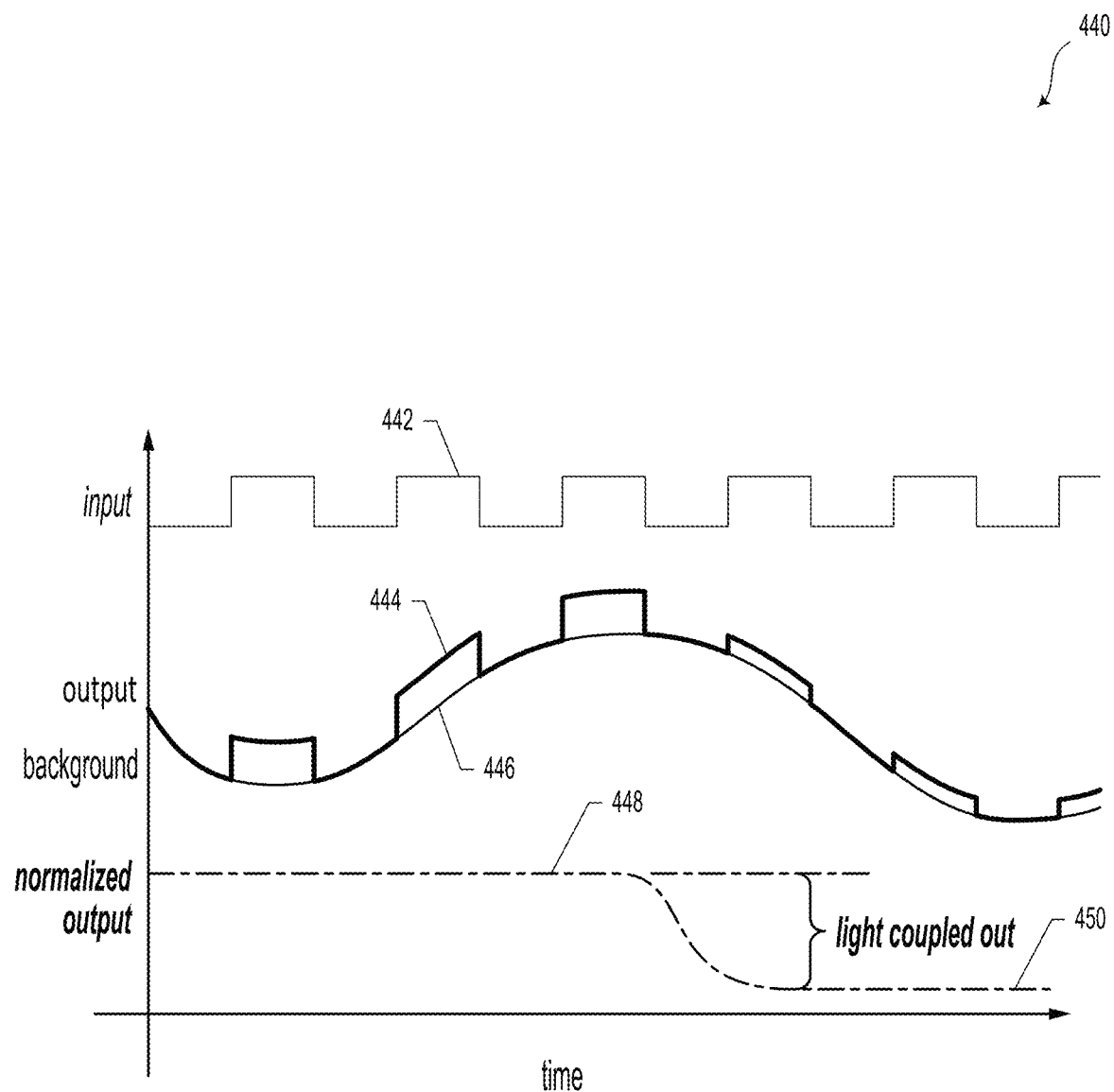
FIG. 4D illustrates a plurality of waveforms, according to an example embodiment.
Figure 5A:
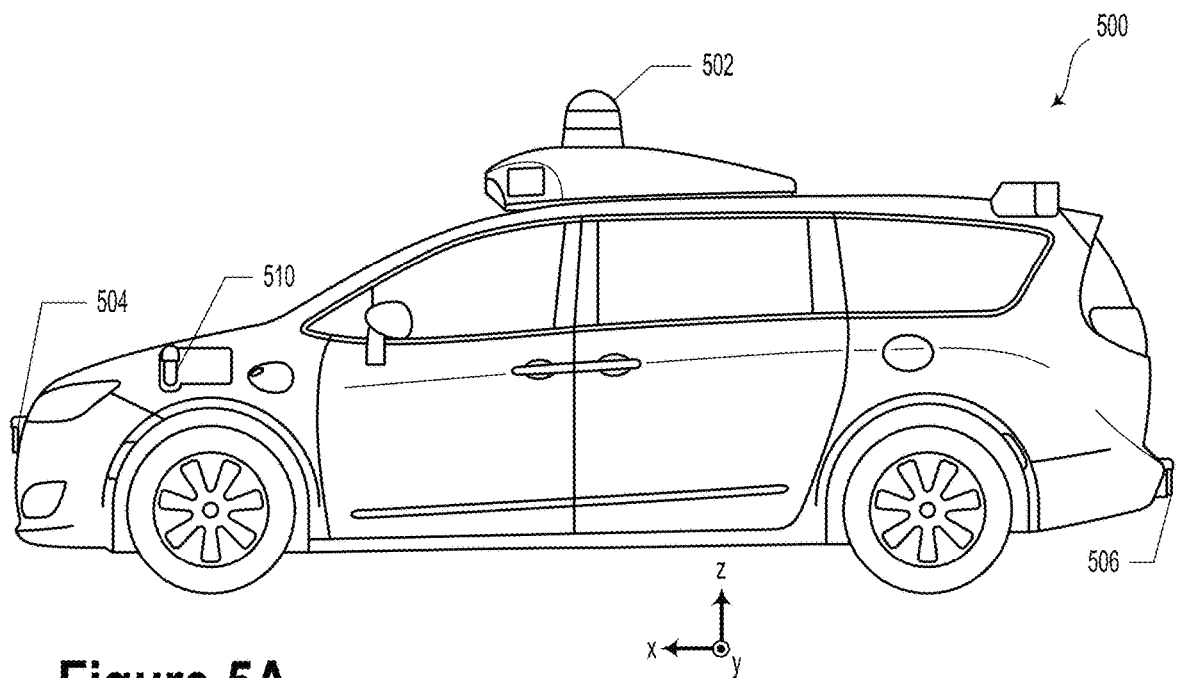
FIG. 5A illustrates a vehicle, according to an example embodiment.
Figure 5B:
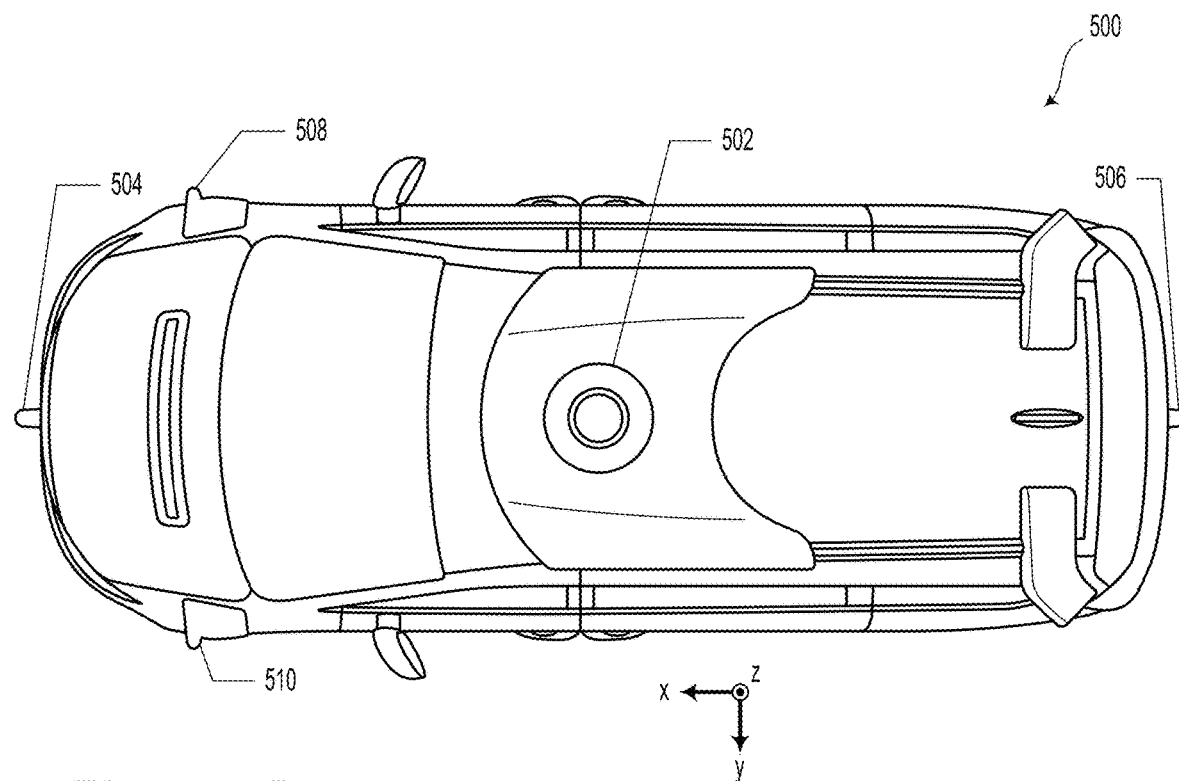
FIG. 5B illustrates a vehicle, according to an example embodiment.
Figure 5C:
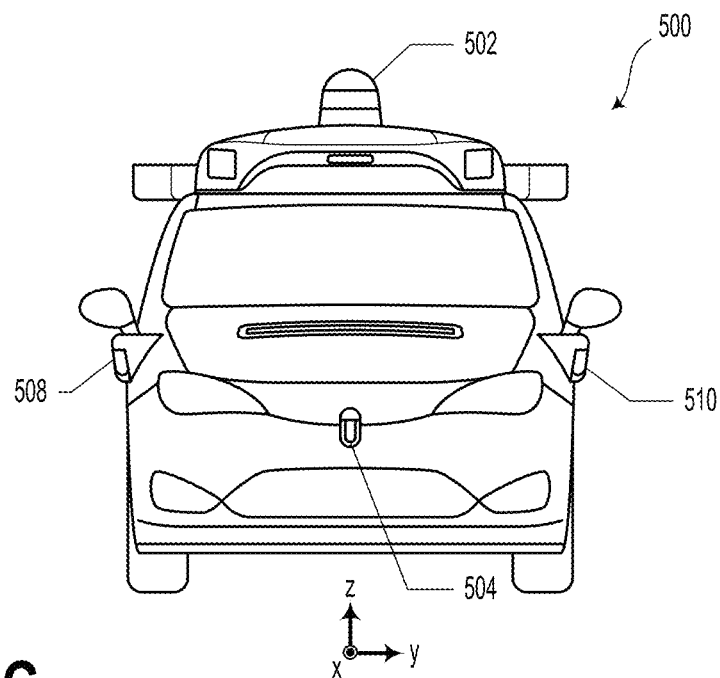
FIG. 5C illustrates a vehicle, according to an example embodiment.
Figure 5D:
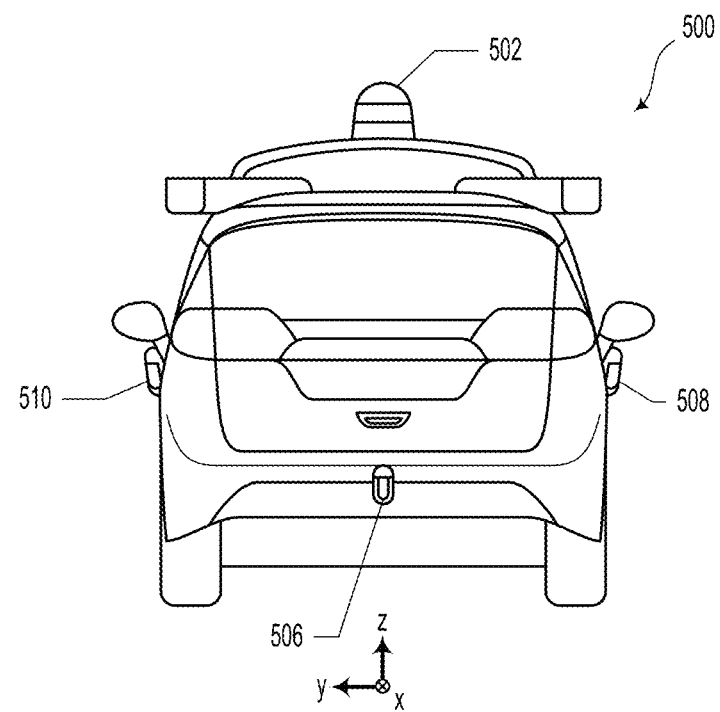
FIG. 5D illustrates a vehicle, according to an example embodiment.
Figure 5E:
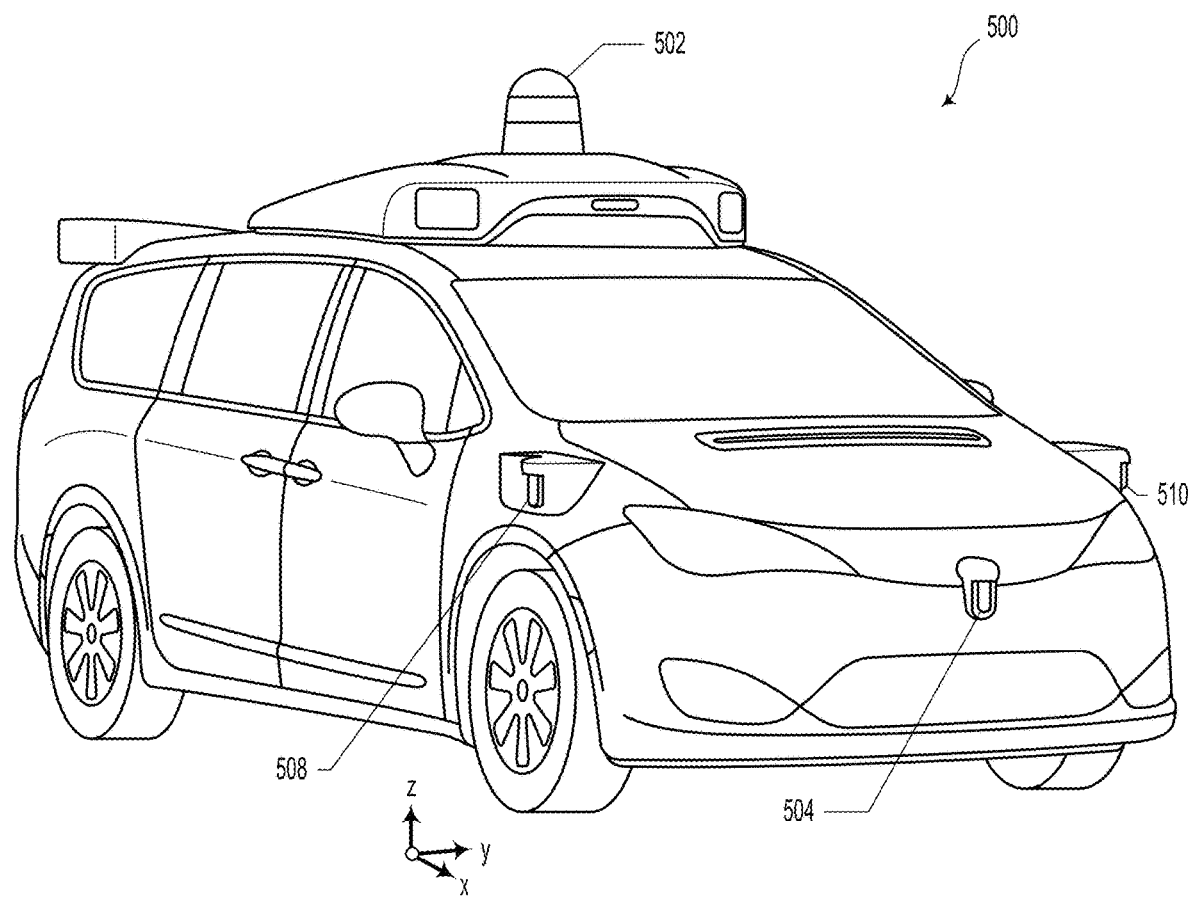
FIG. 5E illustrates a vehicle, according to an example embodiment.

FIG. 4D illustrates a plurality of waveforms 440, according to an example embodiment. As illustrated in FIG. 4D, input waveform 442 could include a periodic square wave that could represent an intensity of emission light provided by light-emitter device 120. The output waveform 444 could include an output of a detector device 130. When a background waveform 446 is subtracted from the output waveform 444, a normalized output waveform 448 could be determined. In the case where a contaminant 12 exists on optical element 10, the output waveform could be reduced due to at least a portion of the light being out-coupled. In such a scenario, a contaminated region 14 could be determined by detecting a reduced normalized output waveform 450. As an example, the reduced normalized output waveform 450 could be determined based on the normalized output waveform 448 falling below a predetermined output threshold.

IV. Example Vehicles

FIGS. 5A, 5B, 5C, 5D, and 5E illustrate a vehicle 500, according to an example embodiment. In some embodiments, the vehicle 500 could be a semi- or fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include contaminant detection systems 100 as illustrated and described in relation to FIG. 1. Additionally or alternatively, sensor systems 502, 504, 506, 508, and 510 could include optical systems 300 as illustrated and described in relation to FIG. 3. In other words, the contaminant detection systems and optical systems described elsewhere herein could be coupled to the vehicle 500 and/or could be utilized in conjunction with various operations of the vehicle 500. As an example, the contaminant detection systems 100 and/or optical systems 300 described herein could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, sensor systems 502, 504, 506, 508, and 510 could include a plurality of light-emitter devices arranged over a range of angles with respect to a given plane (e.g., the x-y plane) and/or arranged so as to emit light toward different directions within an environment of the vehicle 500. For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

Lidar systems with single or multiple light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 5A-5E illustrate various lidar sensors attached to the vehicle 500, it will be understood that the vehicle 500 could incorporate other types of sensors.

Figure 6:
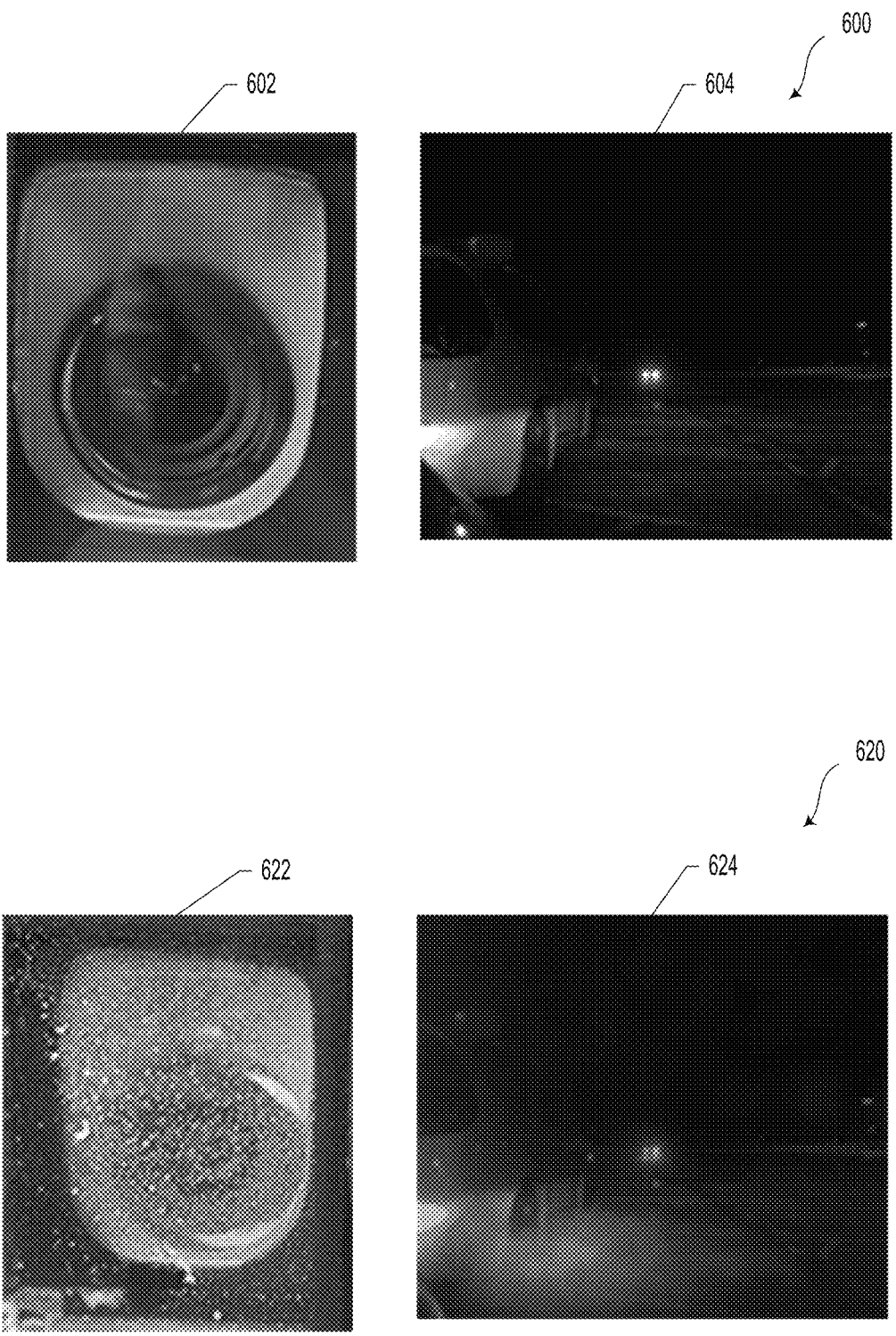
FIG. 6 illustrates imaging scenarios, according to an example embodiment.

FIG. 6 illustrates imaging scenarios 600 and 620, according to an example embodiment. Imaging scenario 600 could include a vehicle-mounted camera (e.g., camera 20) having an optical element 602, which could include an external optical window. In some embodiments, the external optical window could include an optically transparent window. Imaging scenario 600 illustrates the optical element 602 without any visible contaminants. The corresponding image 604 provided by the vehicle-mounted camera could provide a relatively clear and crisp view of surroundings of the vehicle, which may include another vehicle and/or the roadway.

Imaging scenario 620 could include a vehicle-mounted camera having an optical element 622 that is covered in liquid water (e.g., condensation or rain water). As such, imaging scenario 620 illustrates an optical element 622 as having visible contaminants and a contaminated region (e.g., contaminated region 14). The corresponding image 624 provided by the vehicle-mounted camera could provide a blurry view of surroundings of the vehicle, which may include another vehicle and/or the roadway. Within the scope of the present disclosure, such a blurry view of the vehicle's surroundings could be corrected by way of image adjustment and/or otherwise mitigated using a cleaning system (e.g., cleaning system 310).

V. Example Methods

Figure 7:
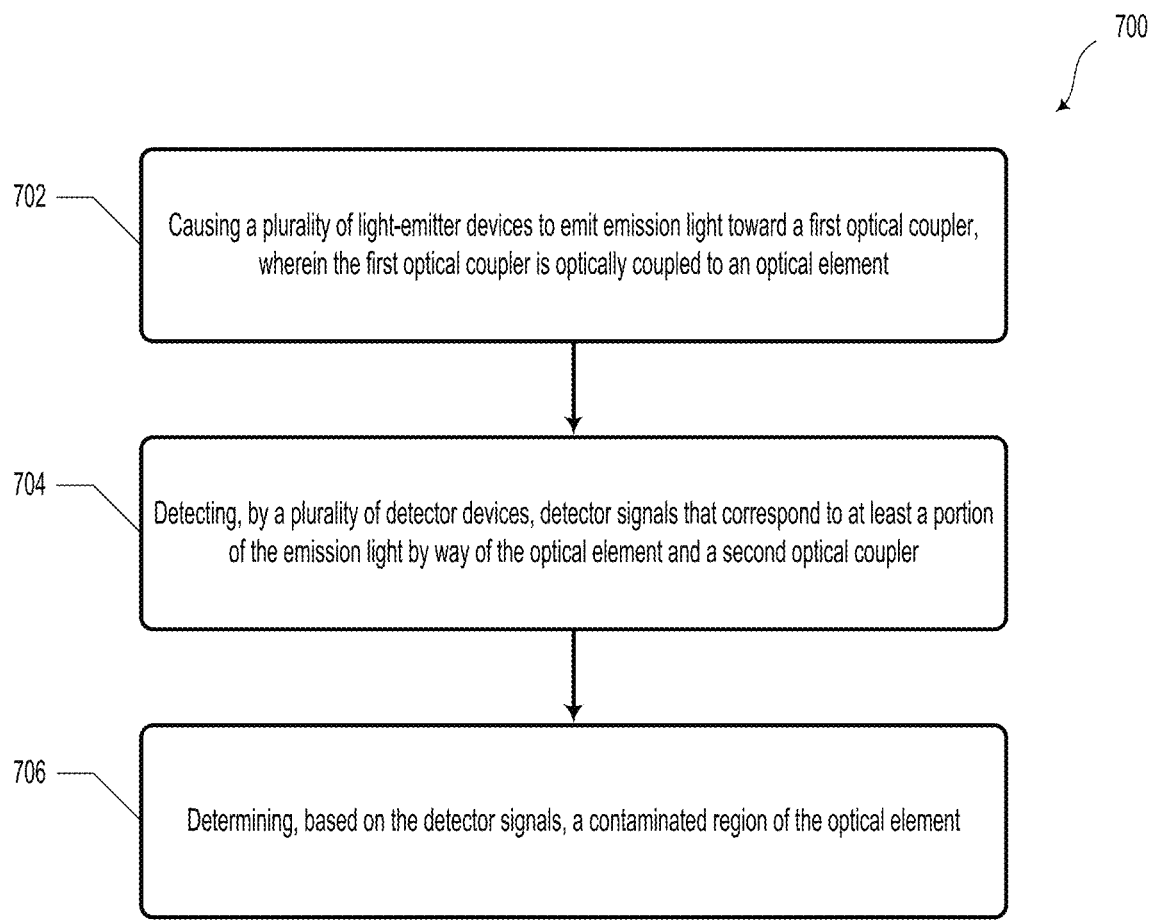
FIG. 7 illustrates a method, according to an example embodiment.

FIG. 7 illustrates a method 700, according to an example embodiment. It will be understood that the method 700 may include fewer or more steps or blocks than those expressly illustrated or otherwise disclosed herein. Furthermore, respective steps or blocks of method 700 may be performed in any order and each step or block may be performed one or more times. In some embodiments, some or all of the blocks or steps of method 700 may relate to elements of contaminant detection system 100, optical system 300, and/or vehicle 500 as illustrated and described in relation to FIGS. 1, 3, and 5A-5E, respectively. For example, method 700 could describe a method of determining a contaminant 12 and/or a contaminated region 14 of an optical element 10 and, in some embodiments, a method for mitigating and/or eliminating one or more effects of the contaminant 12 and/or contaminated region 14 on an image 22 generated by camera 20.

Block 702 includes causing a plurality of light-emitter devices (e.g., light-emitter devices 120) to emit emission light (e.g., emission light 122) toward a first optical coupler (e.g., optical coupler 110a). In such scenarios, the first optical coupler is optically coupled to an optical element (e.g., optical element 10).

Block 704 includes detecting, by a plurality of detector devices (e.g., detector devices 130), detector signals (e.g., detector signals 132) that correspond to at least a portion of the emission light by way of the optical element and a second optical coupler (e.g., optical coupler 110b).

Block 706 includes determining, based on the detector signals, a contaminated region (e.g., contaminated region 14) of the optical element.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A contaminant detection system comprising:
    a first optical coupler configured to couple light into an optical element;
    a second optical coupler configured to couple light out of the optical element;
    a plurality of light-emitter devices configured to emit emission light toward the first optical coupler, wherein the first optical coupler is configured to couple at least a portion of the emission light into the optical element as coupled light that propagates along the optical element by way of total internal reflection, and wherein the second optical coupler is configured to out-couple at least a portion of the coupled light from the optical element; and
    a plurality of detector devices configured to:
        detect at least a portion of the emission light by way of the first optical coupler, the optical element and the second optical coupler; and
        provide detector signals indicative of a presence of a contaminant on the optical element.

2. The contaminant detection system of claim 1, wherein the detector devices are phase- or polarization-sensitive, and wherein providing the detector signals comprises providing phase or polarization information indicative of a presence of a contaminant.

3. The contaminant detection system of claim 1, wherein the second optical coupler includes a lensed portion, and wherein the lensed portion is configured to focus at least a portion of the out-coupled light at or near a location of at least one of the plurality of detector devices.

4. The contaminant detection system of claim 3, wherein the lensed portion has a radius of curvature R, wherein R is between 2 and 10 millimeters.

5. The contaminant detection system of claim 1, further comprising a controller having a processor and at least one memory, wherein the processor executes instructions stored in the at least one memory so as to carry out operations, the operations comprising:
    receiving, from the detector devices, the detector signals;
    determining, based on the detector signals, a presence of a contaminant on the optical element; and
    determining, based on the detector signals, a contaminated region of the optical element.

6. The contaminant detection system of claim 1, wherein the contaminant comprises at least one of: water, dirt, dust, snow or a defect in the optical element.

7. The contaminant detection system of claim 1, wherein the detector devices are additionally configured to provide detector signals indicative of a misalignment of the optical element.

8. An optical system comprising:
    an optical element;
    a camera configured to capture an image of a field of view by way of the optical element;
    a first optical coupler configured to couple light into the optical element;
    a second optical coupler configured to couple light out of the optical element;
    a plurality of light-emitter devices configured to emit emission light toward the first optical coupler, wherein the first optical coupler is configured to couple at least a portion of the emission light into the optical element as coupled light that propagates along the optical element by way of total internal reflection, and wherein the second optical coupler is configured to out-couple at least a portion of the coupled light from the optical element; and
    a plurality of detector devices configured to:
        detect at least a portion of the emission light by way of the first optical coupler, the optical element and the second optical coupler; and
        provide detector signals indicative of a presence of a contaminant on the optical element.

9. The optical system of claim 8, wherein the detector devices are phase- or polarization-sensitive, and wherein providing the detector signals comprises providing phase or polarization information indicative of a presence of a contaminant.

10. The optical system of claim 8, wherein the second optical coupler includes a lensed portion, and wherein the lensed portion is configured to focus at least a portion of the out-coupled light at or near a location of at least one of the plurality of detector devices.

11. The optical system of claim 8 further comprising a controller having a processor and at least one memory, wherein the processor executes instructions stored in the at least one memory so as to carry out operations, the operations comprising:
    receiving, from the detector devices, the detector signals;
    determining, based on the detector signals, a presence of a contaminant on the optical element; and
    determining, based on the detector signals, a contaminated region of the optical element.

12. The optical system of claim 11, further comprising:
a cleaning system, wherein the cleaning system comprises at least one of: a wiper device, a liquid jet device, a gas jet device, or a moveable optical film, and
wherein the operations further comprise: in response to determining the presence of the contaminant, causing the cleaning system to clean the optical element.

13. The optical system of claim 11, wherein the operations further comprise:
determining, based on the detector signals, a contaminated region of the optical element;
causing the camera to capture an image of the field of view; and
adjusting the image based on the contaminated region, wherein adjusting the image based on the contaminated region comprises processing the image to mitigate the effect of the contaminant on the optical element.

14. The optical system of claim 8, wherein the detector devices are additionally configured to provide detector signals indicative of a misalignment of the optical element.

15. A vehicle comprising:
an optical element;
a sensor optically coupled to the optical element, wherein the sensor is configured to obtain information indicative of a field of view by way of the optical element;
a first optical coupler configured to couple light into the optical element;
a second optical coupler configured to couple light out of the optical element;
a plurality of light-emitter devices configured to emit emission light toward the first optical coupler, wherein the first optical coupler is configured to couple at least a portion of the emission light into the optical element as coupled light that propagates along the optical element by way of total internal reflection, and wherein the second optical coupler is configured to out-couple at least a portion of the coupled light from the optical element; and
a plurality of detector devices configured to:
detect at least a portion of the emission light by way of the first optical coupler, the optical element and the second optical coupler; and
provide detector signals indicative of a presence of a contaminant on the optical element.

16. The vehicle of claim 15 further comprising a controller having a processor and at least one memory, wherein the processor executes instructions stored in the at least one memory so as to carry out operations, the operations comprising:
receiving, from the detector devices, the detector signals;
determining, based on the detector signals, a presence of a contaminant on the optical element; and
determining, based on the detector signals, a contaminated region of the optical element.

17. The vehicle of claim 16, further comprising:
a cleaning system, wherein the cleaning system comprises at least one of: a wiper device, a liquid jet device, a gas jet device, or a moveable optical film, and
wherein the operations further comprise: in response to determining the presence of the contaminant, causing the cleaning system to clean the optical element.

18. The vehicle of claim 16, wherein the operations further comprise:
determining, based on the detector signals, a contaminated region of the optical element;
causing the sensor to obtain the information indicative of the field of view; and
adjusting the information associated with the contaminated region, wherein adjusting the information associated with the contaminated region comprises processing the information to mitigate the effects of the contaminant on the obtained information.

19. The vehicle of claim 15, wherein the detector devices are phase- or polarization-sensitive, and wherein providing the detector signals comprises providing phase or polarization information indicative of a presence of a contaminant.

20. The vehicle of claim 15, wherein the second optical coupler includes a lensed portion, and wherein the lensed portion is configured to focus at least a portion of the out-coupled light at or near a location of at least one of the plurality of detector devices.

* * * * *